(12) United States Patent
Turski et al.

(10) Patent No.: US 8,175,785 B2
(45) Date of Patent: May 8, 2012

(54) SYSTEM AND METHOD FOR PERFORMANCE LAUNCH CONTROL OF A VEHICLE

(75) Inventors: Michael P. Turski, Rochester Hills, MI (US); Kevin A. O'Dea, Ann Arbor, MI (US); Eric E. Krueger, Chelsea, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 528 days.

(21) Appl. No.: 12/340,806

(22) Filed: Dec. 22, 2008

(65) Prior Publication Data

US 2010/0161188 A1 Jun. 24, 2010

(51) Int. Cl.
*G06F 7/00* (2006.01)
*G06F 17/00* (2006.01)
*G05D 1/00* (2006.01)
*B60T 7/12* (2006.01)

(52) U.S. Cl. .......... 701/82; 701/70; 701/71; 701/74; 701/84; 701/90; 180/197; 303/159

(58) Field of Classification Search .......... 701/51, 701/53–56, 64–67, 74, 82–87, 90–91, 99, 701/101–115; 180/197; 303/159
See application file for complete search history.

(56) References Cited

U.S. PATENT DOCUMENTS

| | | | | |
|---|---|---|---|---|
| 4,796,739 A * | 1/1989 | Jonner et al. | ........... | 192/13 R |
| 5,219,212 A * | 6/1993 | Shimada et al. | ........... | 303/148 |
| 5,225,982 A * | 7/1993 | Ito et al. | ........... | 701/91 |
| 5,243,526 A * | 9/1993 | Ito et al. | ........... | 701/90 |
| 5,245,542 A * | 9/1993 | Itoh et al. | ........... | 701/90 |
| 5,262,952 A * | 11/1993 | Tsuyama et al. | ........... | 701/87 |
| 5,278,761 A | 1/1994 | Ander et al. | | |
| 5,518,307 A | 5/1996 | Okazaki | | |
| 6,324,461 B1 * | 11/2001 | Yamaguchi et al. | ........... | 701/80 |
| 6,347,680 B1 | 2/2002 | Mianzo et al. | | |
| 6,456,924 B1 | 9/2002 | Schmitt et al. | | |
| 6,757,603 B2 | 6/2004 | Nozaki | | |
| 7,219,497 B2 * | 5/2007 | Kowatari et al. | ........... | 60/608 |
| 7,324,884 B2 | 1/2008 | Spörl et al. | | |
| 7,349,785 B2 * | 3/2008 | Lee et al. | ........... | 701/67 |

(Continued)

FOREIGN PATENT DOCUMENTS

DE 19855332 A1 6/2000

(Continued)

OTHER PUBLICATIONS

Office Action, dated Aug. 4, 2011, for U.S. Appl. No. 12/340,823.

(Continued)

*Primary Examiner* — Jack W Keith
*Assistant Examiner* — Rami Khatib
(74) *Attorney, Agent, or Firm* — Ingrassia Fisher & Lorenz, P.C.

(57) ABSTRACT

A system and related operating method for performance launch control of a vehicle begins by receiving a user-selected driving condition setting that is indicative of road conditions. The method also collects real-time vehicle status data during operation of the vehicle, and derives a target wheel slip profile from the user-selected driving condition setting and the real-time vehicle status data. The actual propulsion system torque of the vehicle is limited using the target wheel slip profile, resulting in improved performance for standstill launches.

5 Claims, 3 Drawing Sheets

U.S. PATENT DOCUMENTS

| | | |
|---|---|---|
| 7,747,363 B1 | 6/2010 | Tang |
| 7,753,156 B2 * | 7/2010 | Nishiike et al. ............... 180/197 |
| 7,765,050 B2 * | 7/2010 | Hrovat et al. ................... 701/82 |
| 7,853,389 B2 * | 12/2010 | Luehrsen et al. ............... 701/82 |
| 2003/0200016 A1 | 10/2003 | Spillane et al. |
| 2005/0064990 A1 * | 3/2005 | Berger ........................... 477/107 |
| 2006/0157315 A1 * | 7/2006 | Kraxner ...................... 192/85 C |
| 2006/0219454 A1 * | 10/2006 | Itoh et al. ...................... 180/197 |
| 2007/0193802 A1 * | 8/2007 | Hu ................................ 180/197 |
| 2008/0105479 A1 * | 5/2008 | Nishiike et al. ............... 180/197 |
| 2008/0183353 A1 * | 7/2008 | Post et al. ....................... 701/42 |
| 2008/0287253 A1 * | 11/2008 | Gibson et al. ................... 477/53 |
| 2009/0012682 A1 * | 1/2009 | Mathis ............................ 701/52 |
| 2010/0049408 A1 * | 2/2010 | Abadie et al. ................... 701/48 |

FOREIGN PATENT DOCUMENTS

| | | |
|---|---|---|
| DE | 19933084 A1 | 1/2001 |
| DE | 10050420 A1 | 3/2003 |
| DE | 10164766 A1 | 5/2003 |
| EP | 1197409 A2 | 4/2002 |
| WO | WO 2008065032 A1 * | 6/2008 |

OTHER PUBLICATIONS

Notice of Allowance, dated Nov. 17, 2011, for U.S. Appl. No. 12/340,823.

* cited by examiner

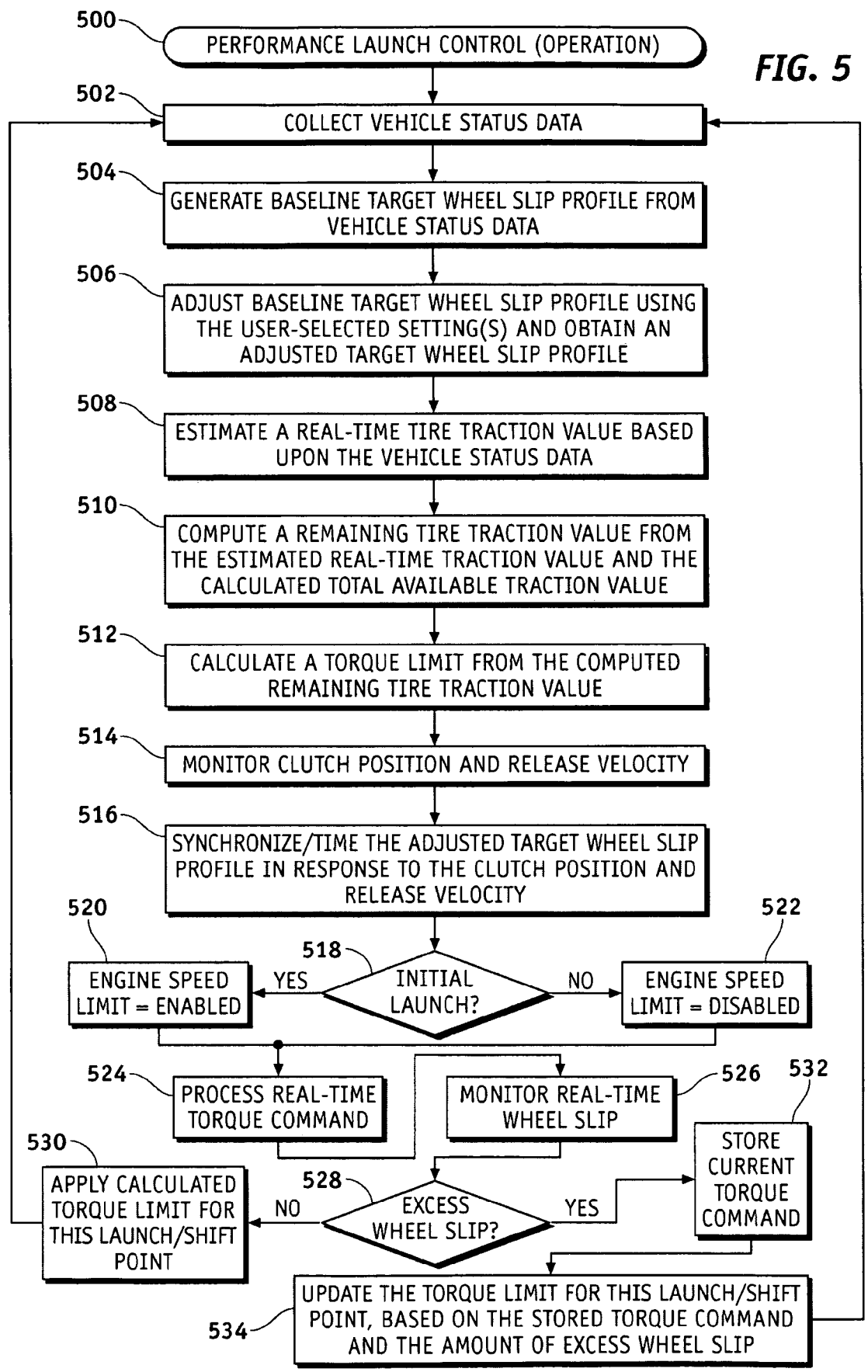

SYSTEM AND METHOD FOR PERFORMANCE LAUNCH CONTROL OF A VEHICLE

TECHNICAL FIELD

Embodiments of the subject matter described herein relate generally to traction control systems for vehicles. More particularly, embodiments of the subject matter relate to an active traction control system that can be used to optimize vehicle acceleration from a standstill.

BACKGROUND

Vehicle traction control systems are well known, and such systems have been deployed in many production vehicles. A traction control system is an active system that monitors the traction (wheel slip) of the vehicle and automatically takes corrective action when excessive wheel slip is detected. The corrective action is intended to stabilize the vehicle, reduce the wheel slip, and keep the vehicle on a safe and predictable path. Conventional traction control systems usually rely on a combination of engine torque control (via throttle adjustment, spark advance, cylinder cutout, etc.) and brake control to quickly and automatically stabilize the vehicle.

BRIEF SUMMARY

A method for performance launch control of a vehicle is provided. The method begins by receiving a user-selected driving condition setting that is indicative of road conditions. The method proceeds by collecting real-time vehicle status data during operation of the vehicle, deriving a target wheel slip profile from the user-selected driving condition setting and the real-time vehicle status data, and limiting actual propulsion system torque of the vehicle using the target wheel slip profile.

An embodiment of a method for performance launch control of a vehicle having an engine and a clutch is also provided. This method involves receiving a user-selected driving condition setting, calculating an engine speed limit in response to the user-selected driving condition setting, and detecting initial launch conditions for the vehicle. The engine speed limit represents a maximum speed for the engine. The method enables the engine speed limit during initial launch and disables the engine speed limit upon subsequent engagement of the clutch.

Also provided is an onboard vehicle-based system for performance launch control of a vehicle having drive wheels. The system includes a user interface subsystem configured to receive a user-selected driving condition setting that is indicative of current road conditions, a vehicle sensor subsystem configured to collect real-time vehicle status data during operation of the vehicle, a propulsion system configured to generate torque for the drive wheels of the vehicle, and a controller coupled to the user interface subsystem, to the vehicle sensor subsystem, and to the propulsion system. The controller is configured to: generate a target wheel slip profile for the vehicle, based upon the user-selected driving condition setting and the real-time vehicle status data; calculate a torque limit for the propulsion system, based upon the user-selected driving condition setting and the real-time vehicle status data; and dynamically regulate actual torque of the propulsion system in response to the target wheel slip profile and the torque limit.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 5 is a flow diagram that illustrates the operation phase of an exemplary embodiment of a performance launch control process.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Figure 2:
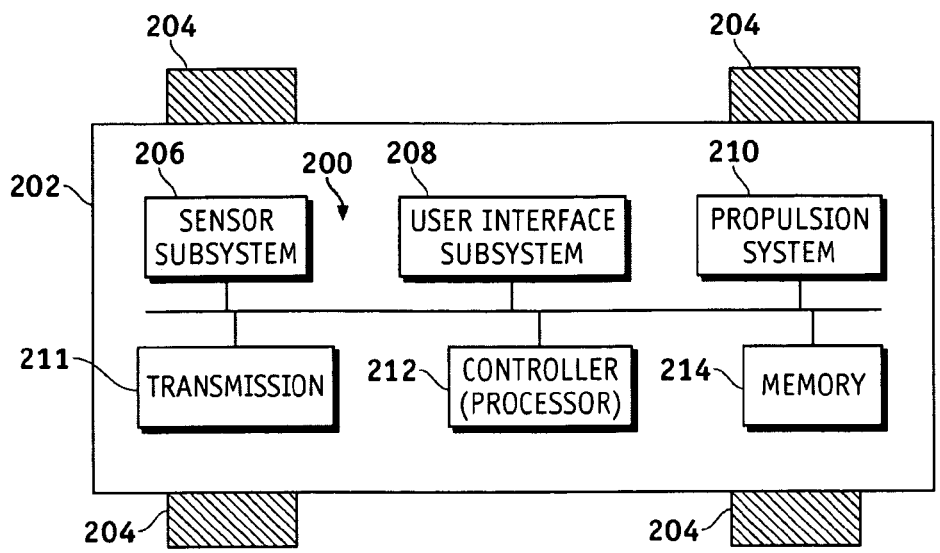
FIG. 2 is a schematic representation of an exemplary embodiment of an active traction control system onboard a vehicle.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

The subject matter described here relates to an active traction control system that is intended for high performance vehicles (e.g., drag race cars) or for any vehicle that might be driven in a high performance launch mode, where the goal is to maximize acceleration from a standstill. In contrast to conventional designs that conservatively reduce engine torque as soon as a low threshold amount of wheel slip is detected, the active traction control system described here allows the vehicle to maximize acceleration during performance launch conditions while allowing some amount of wheel slip, which is typically necessary to reduce the time it takes for the vehicle to reach the desired speed.

The exemplary embodiment of the active traction control system described below is an engine-only control system that is optimized for vehicle performance in environments such as on a race track or autocross course. The system employs a torque control methodology that estimates in real-time (or virtually real-time) the amount of tire traction that is utilized by the vehicle during launch and acceleration. This estimate is then compared to an estimated total available tire capability. The amount of potential tire force that is not being used is then considered to be available for purposes of accelerating the vehicle. The system uses this remaining tire force/traction value to calculate an engine torque limit that will result in the potential tire force. The calculated torque limit is then utilized as an active control limit on the actual driver-initiated engine torque command.

For vehicles with manual transmissions, the active traction control system described herein also employs an engine speed (RPM) limit that is influenced by one or more user-selected settings, e.g., road condition estimates. The optimized RPM is enabled when the vehicle is at a standstill, the clutch is not engaged (the clutch pedal is fully depressed), and the throttle pedal is depressed. If a high performance launch condition is detected, the RPM limit is used to regulate the engine speed such that the initial launch is optimized.

The active traction control system described herein also implements a dynamic wheel slip adjustment methodology that determines the amount of allowable or desirable wheel slip during a performance launch (at the initial launch and at subsequent shift points). The wheel slip profile is influenced by one or more user-selected settings, e.g., road condition estimates. In this regard, if actual wheel slip in excess of a designated target wheel slip amount is detected, the system can adjust the engine torque if needed.

Conventional active traction control systems are designed to achieve vehicle stability at the expense of performance. In contrast, the system described here can be utilized to optimize performance (in particular, performance acceleration such as that experienced during drag racing). The system strives to optimize the longitudinal acceleration of the vehicle after considering real-time driving conditions. This type of active traction control allows the driver to achieve quicker and more consistent elapsed times in a drag racing environment.

Figure 1:
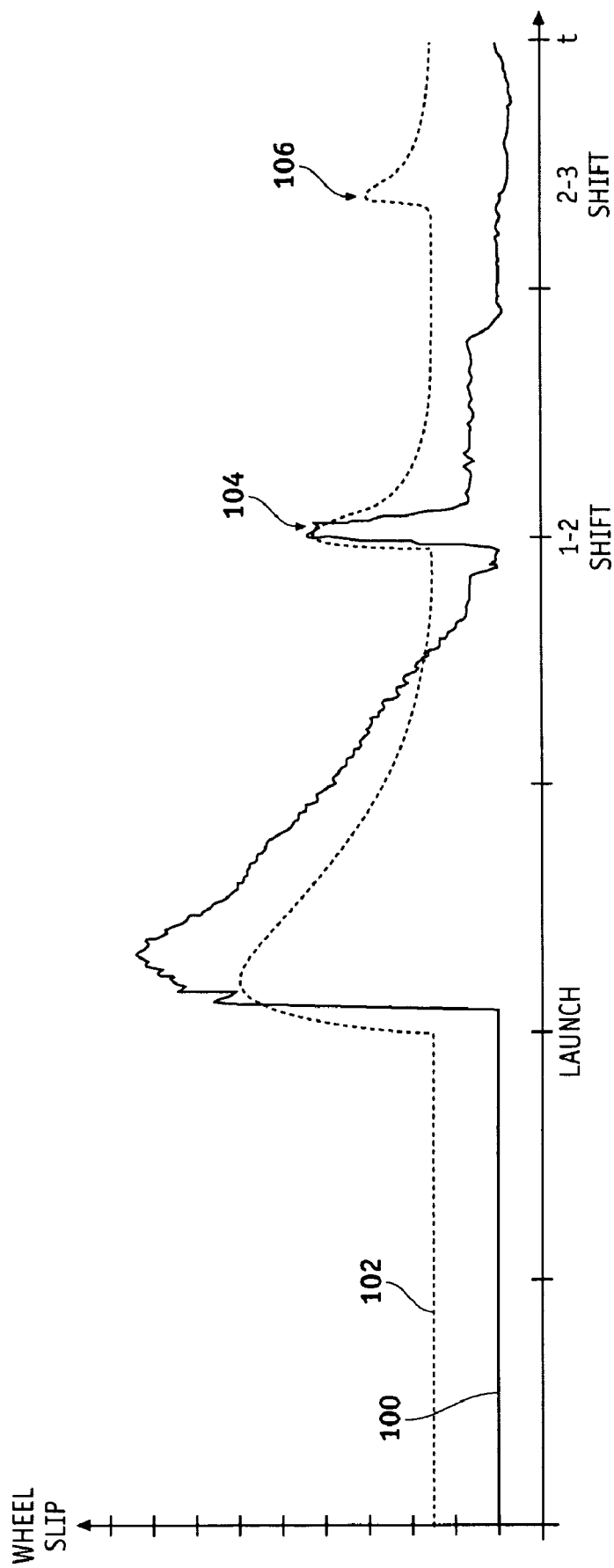
FIG. 1 is a diagram that illustrates wheel slip typically associated with a vehicle undergoing a performance launch from a standstill.

Although the active traction control system and methodologies described herein can be effectively used in any number of different driving scenarios and conditions, certain benefits can be derived when the vehicle is accelerating from a standstill. In this regard, FIG. 1 is a diagram that illustrates wheel slip typically associated with a vehicle undergoing a performance launch from a standstill. In FIG. 1, the horizontal scale represents time and the vertical scale represents wheel slip. The solid plot 100 in FIG. 1 represents the actual wheel slip experienced by the drive tires of the vehicle. Before the actual launch point, the vehicle is at rest and the goal is to launch the vehicle with maximum acceleration after launch and through subsequent shift points. It is well established that some amount of wheel slip is necessary (at initial launch and possibly at other shift points) to optimize acceleration from a standstill. Accordingly, FIG. 1 illustrates the relatively high amount of wheel slip that occurs immediately following the launch point, along with respective amounts of wheel slip that occur in response to the first-to-second gear shift point, the second-to-third gear shift point, and the third-to-fourth gear shift point. FIG. 1 is merely exemplary in nature, and an actual wheel slip plot 100 will vary depending upon the vehicle type, the initial launch conditions, the road and driving conditions, the drive train of the vehicle, etc.

It is well established that excessive wheel slip during launch results in less than optimum acceleration. Likewise, preventing wheel slip during launch will also result in less than optimum acceleration. With this in mind, the active traction control system described herein strives to find the delicate compromise between excessive and insufficient wheel slip during a high performance vehicle launch.

FIG. 2 is a schematic representation of an exemplary embodiment of an active traction control system 200 onboard a vehicle 202. Vehicle 202 includes four wheels, each having a respective tire 204 mounted thereto. Although vehicle 202 may be a rear-wheel drive vehicle, a front-wheel drive vehicle, an all-wheel drive vehicle, or a vehicle having a selective drive configuration, the following description refers to a rear-wheel drive vehicle.

Active traction control system 200 (which is also referred to herein as a performance launch control system) is an onboard vehicle-based system in that its components are located on, carried by, or integrated into the host vehicle 202. System 200 may include or cooperate with at least the following components or elements, without limitation: a vehicle sensor subsystem 206; a user interface subsystem 208; a propulsion system 210; a transmission system 211; a controller 212; and an appropriate amount of memory 214. These and other elements of system 200 are coupled together in an appropriate manner to accommodate the communication of data, control commands, and signals as needed to support the operation of system 200. For the sake of brevity, conventional techniques related to vehicle control systems, vehicle sensor systems, torque management, and other functional aspects of the systems (and the individual operating components of the systems) may not be described in detail herein.

Sensor subsystem 206 is suitably configured to collect real-time (and possibly non-real-time) vehicle status data during operation of vehicle 202. System 200 can process some or all of this vehicle status data in the manner described below, and other subsystems or components of vehicle 202 might also process or utilize some or all of this vehicle status data. In certain embodiments, sensor subsystem 206 includes sensors (not shown) that collect data indicative of the yaw, pitch, and roll rates of the vehicle, the lateral, longitudinal, and vertical accelerations of the vehicle, the velocity of the vehicle, the throttle or throttle pedal position, the engine speed, the rotational velocity of the wheels of the vehicle, the wheel slip associated with the wheels of the vehicle, the wheel position relative to the body of the vehicle, the clutch or clutch pedal position, the clutch pedal velocity, the clutch engagement status, or the like. The design, configuration, and operational details of such vehicle-based sensors will not be described herein because these sensors and their applications are well known to those familiar with the automotive industry.

User interface subsystem 208 is suitably configured as a human-machine interface for vehicle 202 and, in particular, for system 200. User interface subsystem 208 can be realized using one or more elements, features, devices, or components, which may be conventional in nature. For example, user interface subsystem 208 may include, without limitation, any number of: buttons; knobs; switches; levers; dials; keypads; touch screens; touch pads; or the like. To support system 200, user interface subsystem 208 preferably includes one or more features or elements configured to receive a user-selected driving condition setting that is indicative of current road conditions, the current road coefficient of friction, a current tire-to-road traction value, or the like. In certain embodiments, user interface subsystem 208 also includes one or more features or elements configured to receive a user-selected vehicle handling setting, which might be indicative of a desired suspension feel, a desired handling limit, or the like.

Figure 3:
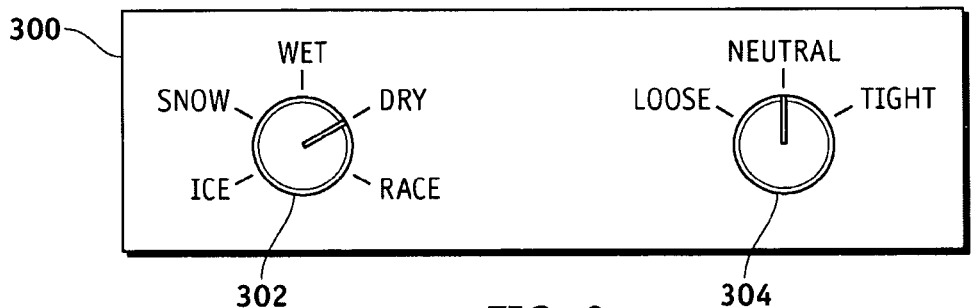
FIG. 3 is a front panel view of an exemplary embodiment of a user interface subsystem suitable for use with an active traction control system.

FIG. 3 is a front panel view of an exemplary embodiment of a user interface subsystem 300 suitable for use with system 200. Indeed, user interface subsystem 208 (FIG. 2) might incorporate the elements shown in FIG. 3. This particular embodiment of user interface subsystem 300 includes two mechanical knobs that are designed to be manually actuated by the driver. A first knob 302 is manipulated to designate the user-selected driving condition setting. Although any number of different settings can be supported by system 200, this embodiment includes at least the following settings: an icy road setting; a snowy road setting; a wet road setting; a dry road setting; and a race track setting. Notably, these settings generally represent a range of driving conditions corresponding to different tire traction potentials. For example, under icy conditions system 200 can assume that the total available potential tire traction is relatively low. In contrast, under race track conditions (e.g., desirable road conditions and race tires) system 200 can assume that the total available potential tire traction is relatively high. In alternate embodiments, user interface subsystem 300 need not be limited to a specific number of discrete driving condition settings. In such embodiments, user interface subsystem 300 could be suitably configured to select any number of different driving condition settings defined between any two boundary settings. The significance of the user-selected driving condition setting will be explained in greater detail below.

A second knob 304 of user interface subsystem 300 is manipulated to designate the user-selected vehicle handling setting. Although any number of different settings can be supported by system 200, this embodiment includes at least the following settings: a loose setting; a neutral, intermediate, average, or middle setting; and a tight setting. Notably, these settings generally represent a range of vehicle handling preferences corresponding to different suspension and/or handling traits, characteristics, or "feel" of the vehicle. For example, the loose setting can be selected if the driver prefers to experience a manageable but safe amount of wheel slip and "looser" active control of the vehicle. In contrast, the tight setting can be selected if the driver prefers to experience little or no wheel slip and "tighter" active control of the vehicle. In alternate embodiments, user interface subsystem 300 need not be limited to a specific number of discrete vehicle handling settings. In such embodiments, user interface subsystem 300 could be suitably configured to select any number of different vehicle handling settings defined between any two boundary settings. The significance of the user-selected vehicle handling setting will be explained in greater detail below.

Referring again to FIG. 2, vehicle 202 obtains tractive force from propulsion system 210. Propulsion system 210 may include an internal combustion engine, an electric motor, or a combination thereof. Propulsion system 210 is suitably configured to generate torque for the drive wheels of vehicle 202. In practice, propulsion system 210 responds to driver-initiated commands (e.g., throttle) to increase or decrease the torque delivered to the drive wheels in a real-time manner. Moreover, system 200 can provide automatic and active real-time control of propulsion system 210 under certain operating conditions, as described in more detail herein.

Transmission system 211 is coupled between propulsion system 210 and the drive wheels of vehicle 202. Transmission system 211 is responsible for selecting and changing gears during operation of vehicle 202. Notably, transmission system 211 may be a manual transmission system that includes or cooperates with a manual clutch, or it may be an automatic transmission system. Sensor subsystem 206 may include sensors that cooperate with transmission system 211 for purposes of detecting operating parameters associated with transmission system 211. Such operating parameters may include, without limitation: the currently selected gear; an expected next gear; clutch position; clutch pedal rate; or the like.

Controller 212 can be operatively coupled to vehicle sensor subsystem 206, user interface subsystem 208, and propulsion system 210 in an appropriate manner. Controller 212 may be implemented using one or more processors, which may be co-located or distributed throughout vehicle 202. In this regard, controller 212 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. Controller 212 may be realized as a microprocessor, a controller, a microcontroller, or a state machine. Moreover, controller 212 may be implemented as a combination of computing devices, e.g., a combination of a digital signal processor and a microprocessor, a plurality of microprocessors, one or more microprocessors in conjunction with a digital signal processor core, or any other such configuration.

Memory 214 may be volatile (such as RAM), non-volatile (such as flash memory, etc.) or a combination thereof. In this regard, memory 214 can be coupled to controller 212 such that controller 212 can read information from, and write information to, memory 214. In the alternative, memory 214 may be integral to controller 212. As an example, controller 212 and memory 214 may reside in an ASIC. Memory 214 supports the active traction control techniques described herein by storing and recording collected vehicle status data, user-selected settings, and possibly other information that might be used or needed by system 200.

Figure 4:
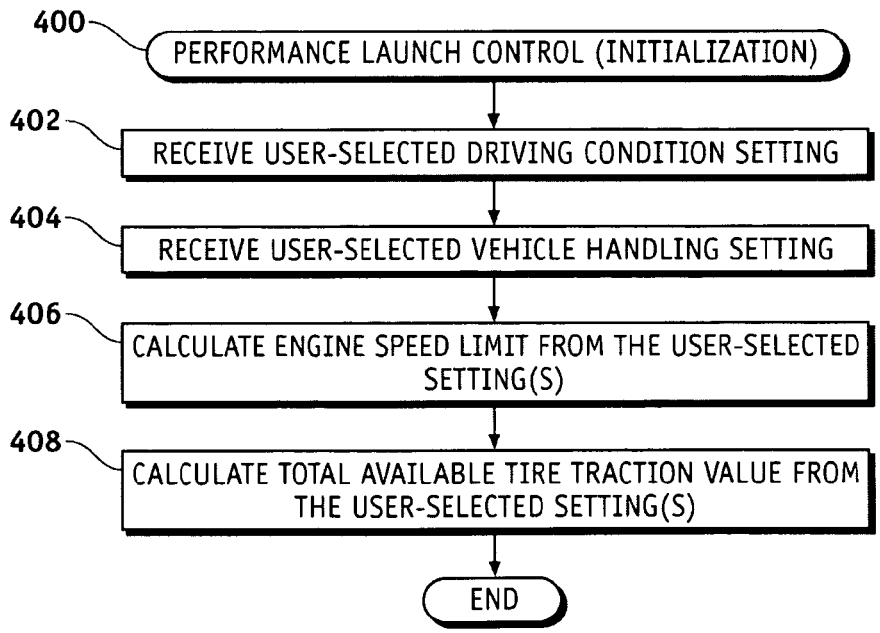
FIG. 4 is a flow diagram that illustrates the initialization phase of an exemplary embodiment of a performance launch control process.

FIG. 4 is a flow diagram that illustrates the initialization phase of an exemplary embodiment of a performance launch control process 400. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system, e.g., an onboard sensor, a controller, or a user interface component. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein.

Process 400 represents an initialization procedure in that it need not be performed in a dynamic manner during operation of the vehicle. This embodiment of process 400 receives a user-selected driving condition setting (task 402) that is indicative of road coefficient of friction, road conditions, the current weather conditions, the type of tires mounted to the vehicle, etc. As mentioned above with reference to FIG. 3, the selected driving condition setting may be an icy road setting, a snowy road setting, a wet road setting, a dry road setting, a race track setting, or the like. Additionally (or alternatively), process 400 may receive a user-selected vehicle handling setting (task 404). As mentioned above with reference to FIG. 3, the selected vehicle handling setting may be a loose setting, a neutral setting, a tight setting, or the like. Depending upon the system deployment, process 400 could receive more (or less) user-selected settings that influence, govern, or otherwise affect the active traction control routine.

Process 400 may continue by calculating or generating an engine speed limit or threshold from the user-selected setting or settings (task 406). Alternatively (or additionally), the engine speed limit could be influenced by a user-entered value. This engine speed limit may be provided in any format or units that can be understood by the system. For example, the engine speed limit can be expressed in RPM. In practice, the engine speed limit represents a maximum engine speed that will result in optimized initial launch conditions for the vehicle. When the engine speed limit is enabled, the system will allow the engine to operate up to the engine speed limit. Otherwise, excessive engine speed could result in an undesirable amount of wheel spin at the initial launch. Thus, with the engine speed limit enabled, an upper RPM limit is placed on the engine, and once that RPM limit is reached, it will be maintained even if the throttle pedal is depressed further.

Process 400 may continue by calculating or generating a total available tire traction value from the user-selected setting or settings (task 408). For example, the total available tire traction value could be generated in response to the user-selected driving condition setting, in response to the user-selected vehicle handling setting, or in response to both. As used herein, the total available tire traction value represents an estimate of the total available tire capability, friction, longitudinal force capacity, and/or lateral force capacity. In preferred embodiments, the total available tire traction value is a force expressed in Newtons. The user-selected driving condition setting influences the total available tire traction value—relatively slick driving conditions (e.g., icy) will result in a lower total available tire traction value, while relatively grippy driving conditions (e.g., race) will result in a higher total available tire traction value. Similarly, the user-selected vehicle handling setting also influences the total available tire traction value—the loose setting will result in a higher total available tire traction value (which allows the vehicle to experience more wheel slip before torque limiting takes place), while the tight setting will result in a lower total available tire traction value (which allows the vehicle to experience less wheel slip before torque limiting takes place). In practice, task 408 can calculate the total available tire traction value as a suitable and appropriate function of the user-selected setting(s). For example, in certain embodiments the user-selected settings are used to modify a preselected or predetermined nominal value of a tire friction coefficient. This nominal value can then be multiplied or otherwise adjusted using a tire normal force estimate to obtain the total estimated tire force. Other approaches or algorithms can be employed to improve the system performance, and the above represents merely one suitable example.

Notably, process 400 could be performed as soon as the user selects the settings, regardless of whether the vehicle is idling or operating. Indeed, process 400 could be performed during a time when the engine is not running. Eventually, however, the vehicle will be driven on a road, a race track, or a course. At this time, the performance launch control enters an operation phase. In this regard, FIG. 5 is a flow diagram that illustrates the operation phase of an exemplary embodiment of a performance launch control process 500. The various tasks performed in connection with process 500 may be performed by software, hardware, firmware, or any combination thereof. For illustrative purposes, the following description of process 500 may refer to elements mentioned above in connection with FIGS. 1-3. In practice, portions of process 500 may be performed by different elements of the described system, e.g., an onboard sensor, a controller, or a user interface component. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein.

Process 500 can be performed at any time during operation of the vehicle or when the vehicle is preparing for a standstill launch, e.g., at the starting line of a drag race. In this regard, process 500 collects vehicle status data (task 502) from one or more onboard vehicle sensors. Task 502 preferably collects the vehicle status data in real-time or virtually real-time so that process 500 can immediately react to the current operating status of the vehicle. In preferred embodiments, task 502 collects vehicle status data such as the yaw, pitch, and roll rates of the vehicle, the lateral, longitudinal, and vertical accelerations of the vehicle, the velocity of the vehicle, the throttle or throttle pedal position, the engine speed, the rotational velocity of the wheels of the vehicle, the wheel slip associated with the wheels of the vehicle, the wheel position relative to the body of the vehicle, the clutch or clutch pedal position, the clutch pedal velocity, the clutch engagement status, or the like. In practice, the vehicle status data can be refreshed and sampled quickly and often, e.g., once every five to twenty milliseconds.

The sampled vehicle data can then be processed in an appropriate manner to generate a baseline target wheel slip profile (task 504). Task 504 is performed in real-time (or virtually real-time) during operation of the vehicle to dynamically compensate for the actual operating state of the vehicle. This baseline target wheel slip profile is then adjusted, modified, or otherwise processed to obtain an adjusted target wheel slip profile (task 506). Notably, the user-selected setting (or settings) is used to derive the adjusted target wheel slip profile. Thus, the adjusted target wheel slip profile is influenced by the real-time vehicle data and by the user-selected setting(s). The adjusted target wheel slip profile represents and defines a maximum desired wheel slip amount for the vehicle, beginning at the initial launch point and, in preferred embodiments, continuing through all of the subsequent shift points. In practical embodiments, wheel slip is either a delta speed (meters/second) difference between the wheel speed and estimated or measured vehicle speed, or a percentage difference between the wheel speeds and the estimated or measured vehicle speed:

$$100 \times \frac{WS - VS}{VS},$$

where WS represents wheel speed and VS represents vehicle speed.

For preferred embodiments, the adjusted target wheel slip profile will be influenced by real-time vehicle status data, such as the vehicle speed, the engaged gear, the clutch position, the clutch pedal velocity, the throttle position, the engine speed, or the like. For example, when the vehicle is at zero velocity, the clutch is not engaged, and the throttle pedal is depressed (pre-launch conditions), the adjusted target wheel slip profile might accommodate a high amount of wheel slip. If, however, the vehicle is traveling at a nonzero velocity, the clutch is not engaged, and the throttle pedal is not depressed (shifting conditions), the adjusted target wheel slip profile might allow a lower amount of wheel slip, which could be dependent upon the particular shift point. For illustrative purposes, FIG. 1 depicts the characteristics of an adjusted target wheel slip profile 102, which may be generated by task 506. Notably, at the launch point, adjusted target wheel slip profile 102 is enabled and it designates a relatively high amount of wheel slip for the vehicle. This characteristic is normal and desirable at the initial launch point. Immediately thereafter, however, adjusted target wheel slip profile 102 quickly decays. This trend is desirable to maximize acceleration of the vehicle after first gear has been engaged.

The next peak 104 in adjusted target wheel slip profile 102 is substantially lower. This peak 104 corresponds to the first-to-second gear shift point. Here, a lower amount of wheel slip is tolerable, relative to the amount of wheel slip at the initial launch point. For this example, the peak 106 at the second-to-third gear shift point has decayed further. Although not shown in FIG. 1, the peaks in adjusted target wheel slip profile 102 for subsequent shift points will preferably follow this decaying trend. Thus, adjusted target wheel slip profile 102 defines the highest target wheel slip for the initial launch point, and decreasing wheel slip thereafter for increasing shift points. In other words, the maximum amount of tolerable wheel slip decreases with each subsequent gear shift.

Concurrently, sequentially, or simultaneously with tasks 504 and 506, the sampled vehicle status data can be processed in an appropriate manner to estimate a real-time tire traction value (task 508). Task 508 is performed in real-time (or virtually real-time) during operation of the vehicle to estimate the actual amount of tire traction potential that is being utilized during the current driving maneuver. For this embodiment, the real-time tire traction value represents an estimate of lateral force in Newtons. Lateral force is considered here to accommodate situations where the vehicle might be traveling in a corner. For example, if the vehicle is at rest or traveling at a low velocity in a straight line, then the real-time tire traction value will be relatively high, which indicates a "surplus" of tire traction available for longitudinal acceleration. In contrast, if the vehicle is launching or undergoing a sudden gear shift under race conditions, then the real-time tire traction value will be relatively low, which indicates little remaining tire traction available.

Process 500 can then calculate, generate, compute, or derive a remaining tire traction value (task 510) from the estimated real-time tire traction value and from the total available tire traction value (which was calculated during task 408 of process 400). This remaining tire traction value is based on a comparison of the estimated real-time tire traction value to the total available tire traction value. More specifically, task 510 computes the remaining tire traction value by subtracting the estimated real-time tire traction value from the total available tire traction value. In this regard, the remaining tire traction value (which is expressed in units of Newtons in this example) may be the actual calculated difference or it may be a value that is derived from or influenced by the actual calculated difference. Notably, the remaining tire traction value represents the "surplus" tire traction capacity or capability for the current real-time operating conditions. In other words, a positive remaining tire traction value indicates that the vehicle can be accelerated harder without experiencing detrimental wheel slip or loss of control. For this particular embodiment, a higher remaining tire traction value indicates that the vehicle is being driven below its full launch potential, while a lower remaining tire traction value indicates that the vehicle is being driven closer to its full launch potential.

Next, process 500 calculates a traction system torque limit from the remaining tire traction value (task 512). In alternate embodiments, the torque limit could be calculated concurrently with the computation of the remaining tire traction value. Task 512 may be associated with a suitable conversion formula or algorithm that converts the remaining tire traction value into the torque limit. The torque limit is associated with a maximum allowable torque command for the traction system of the vehicle—the torque limit is an estimate of the torque that the drive tire can handle without experiencing excessive wheel slip at a launch or shift point. For this example, the torque limit is expressed in units of Newton-meters. In practical deployments, the torque limit will be expressed in a format that can be recognized and processed by the active traction control elements of the vehicle (e.g., throttle control, ignition timing control, cylinder cutout control, etc.). Notably, this torque limit will be influenced by the user-selected driving condition setting, the user-selected vehicle handling setting, and/or the real-time vehicle status data (as applicable). As explained below, this real-time torque limit can be used to limit the actual traction system torque of the vehicle if necessary.

Concurrently, sequentially, or simultaneously with tasks 504-512, process 500 monitors or detects clutch status data such as the clutch position and clutch pedal release velocity (task 514) in real-time or substantially real-time. Although this clutch status data is used to derive the adjusted target wheel slip profile, it can also be used to determine when the driver is shifting gears, whether the driver is "feathering" the clutch or "popping" the clutch at initial launch and between gears, and/or to otherwise influence the application and influence of the adjusted target wheel slip profile. In this regard, process 500 may synchronize, align, or apply the adjusted target wheel slip profile in response to the current clutch position and clutch release velocity (task 516). In other words, the clutch position and pedal release velocity can be indicative of the launch point or one of the shift points. Thus, the system can synchronize the corresponding peaks of the adjusted target wheel slip profile (see FIG. 1) to the respective clutch engagement points, such that the correct amount of target wheel slip is utilized at the detected time.

If process 500 detects initial launch conditions (query task 518), then it enables (task 520) the engine speed limit, which was calculated during task 406 of the initialization process. As explained previously, certain vehicle status data may be indicative of an initial launch condition, e.g., vehicle speed less than a relatively low threshold value such as five MPH, the clutch fully disengaged (the clutch pedal is fully depressed), and the throttle pedal depressed. When enabled, the engine speed limit will serve as a maximum RPM value for the vehicle. If the actual throttle command results in an engine speed that is less than the limit, then there will be no effect. Conversely, if the actual throttle command would otherwise result in an engine speed that is greater than the limit, then the system will scale the actual throttle command (or otherwise regulate the operation of the engine) such that the engine speed does not exceed the limit.

If query task 518 does not detect initial launch conditions, then the engine speed limit remains disabled (task 522). Thus, for this preferred embodiment the engine speed limit is only utilized for the initial vehicle launch. Thereafter, the engine speed is not capped by the engine speed limit while driving or while performing subsequent gear shifts. In practical embodiments, process 500 can enable the engine speed limit for initial launch, and until subsequent engagement of the clutch (which is indicative of the actual launch point). In other words, process 500 may sense when the clutch is engaged after the initial launch and, in response thereto, disable the engine speed limit. Regardless of whether or not the engine speed limit is enabled, during operation of the vehicle the system will process real-time torque commands (task 524) that are generated in response to driver input (e.g., throttle pedal actuation). These torque commands influence the power output of the propulsion system, which in turn influences the torque applied to the drive wheels of the vehicle, which in turn influences the forces experienced by the tires during acceleration.

During operation of the vehicle, process 500 also monitors, in real-time or substantially real-time, the wheel slip of the vehicle (using conventional techniques and technologies) to detect whether or not excess wheel slip is present (task 526). In this regard, excess wheel slip is detected when the actual measured wheel slip is more than the amount designated by the adjusted target wheel slip profile at that particular time. Thus, if process 500 detects an amount of wheel spin that does not exceed the corresponding amount defined by the adjusted target wheel slip profile (query task 528), then process 500 will apply the calculated torque limit for the current launch or shift point (task 530). Notably, the torque limit applied at this time is the one calculated during task 512.

In practice, the calculated torque limit can be applied in the following manner. If the real-time torque command (task 524) exceeds the computed torque limit, then process 500 actively limits the actual traction system torque of the vehicle. It should be appreciated that the system may perform an absolute comparison or it may determine whether the real-time torque command exceeds the computed torque limit by at least a defined threshold amount. In preferred embodiments, the system actively limits the actual torque output of the propulsion system using the calculated torque limit as a maximum limit. Depending upon the particular deployment, the system may leverage one or more conventional techniques to implement the active torque control, including, without limitation: active throttle control; ignition timing control; cylinder cutout control; electric current limiting or regulation (for electric motors); clutch slip control; viscous coupling control; or the like. Although a practical implementation may actively regulate braking, preferred embodiments designed for performance launching and drag racing conditions only regulate aspects of the propulsion system because braking would otherwise hinder the elapsed time.

Notably, process 500 allows the vehicle to experience some wheel slip while still implementing active torque control (task 530). FIG. 5 depicts task 530 leading back to task 502. This represents the iterative and continuous nature of process 500. In other words, process 500 is preferably repeated in a rapid manner such that the active launch control system can respond immediately to changes in the current vehicle operating status.

Referring again to query task 528, if process 500 detects an amount of wheel spin that exceeds the corresponding amount defined by the adjusted target wheel slip profile, then the system can take appropriate corrective action. More specifically, process 500 stores or records the current torque command (task 532), which is based upon the real-time driver manipulation of the throttle. This stored value is held constant as long as the wheel slip control is in effect. This stored value is usually close to the torque value associated with the tire peak capability. Using this stored value as a starting point for the calculations allows for better wheel control with lower wheel slip feedback gains.

The stored value corresponds to the real-time torque command at the time when the excess wheel slip is detected. The stored value is then used to update the torque limit for the respective launch or shift point (task 534). In preferred embodiments, the updated torque limit is calculated as a function of the stored torque limit, the amount of wheel slip error (i.e., the difference between the actual measured wheel slip and the maximum desirable wheel slip as specified by the adjusted target wheel slip profile), and a proportional/derivative gain value that is scheduled on vehicle speed and lateral acceleration. More specifically, the proportional gain term is a function of the vehicle speed and the lateral acceleration of the vehicle. This gain term is multiplied by the wheel slip error to obtain the proportional term of the wheel slip torque. The derivative term is similar except that it is multiplied by the rate of change of the wheel slip error. The updated torque limit can then be applied in the manner described above to actively adjust the torque output of the traction system as needed. This dynamic updating of the torque limit continues until the actual measured wheel slip drops below the maximum amount defined by the adjusted target wheel slip profile.

FIG. 5 depicts task 534 leading back to task 502. This represents the iterative and continuous nature of process 500. In other words, process 500 is preferably repeated in a rapid manner such that the active launch control system can respond immediately to changes in the current vehicle operating status.

It should be appreciated that the techniques and technologies described above can also be implemented in vehicles having automatic transmissions. For such vehicles, the same overall approach, strategy, and methodology is utilized (without the pre-launch engine speed limiting). Thus, the launch point for a vehicle having an automatic transmission will generally correspond to the acts of releasing the brake and depressing the accelerator pedal. During a typical performance launch routine, the driver will fully depress the accelerator pedal as quickly as possible. Once that action is detected, the system will monitor for excess wheel slip and/or actively control the traction system torque at launch, during acceleration, and while the automatic transmission changes gears. Regarding the adjusted wheel slip profile for an automatic transmission vehicle, the synchronization and application of the profile is influenced by the real-time vehicle speed and an expected gear signal generated by the transmission control module.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for performance launch control of a vehicle having an engine and a clutch, the method comprising:
- receiving a user-selected driving condition setting;
- calculating an engine speed limit in response to the user-selected driving condition setting, the engine speed limit representing a maximum speed for the engine during initial launch conditions;
- calculating a total available tire traction value from the user-selected driving condition setting;
- collecting real-time vehicle status data during operation of the vehicle;
- generating a baseline target wheel slip profile from the vehicle status data;
- adjusting the baseline target wheel slip profile, using the user-selected driving condition setting, to obtain an adjusted target wheel slip profile; and
- estimating, based on the real-time vehicle status data, a real-time tire traction value corresponding to lateral force tire traction potential;
- computing a remaining tire traction value by subtracting the estimated real-time tire traction value from the calculated total available tire traction value, to obtain a surplus tire traction capacity for current real-time operating conditions;
- calculating a torque limit for the engine, based on the remaining tire traction value;
- detecting initial launch conditions for the vehicle;
- enabling the engine speed limit until subsequent engagement of the clutch; and
- limiting actual engine torque of the vehicle using the torque limit.

2. The method of claim 1, further comprising disabling the engine speed limit following initial launch of the vehicle.

3. The method of claim 1, wherein the receiving step receives a user-selected driving condition setting that is selected from the group consisting of: a wet road setting; a dry road setting; a race track setting; a snowy road setting; and an icy road setting.

4. The method of claim 1, further comprising:
- sensing when the clutch is engaged; and
- in response to the sensing step, disabling the engine speed limit.

5. The method of claim 1, wherein the vehicle status data includes data selected from the group consisting of: yaw rate; pitch rate; roll rate; lateral acceleration; longitudinal acceleration; vertical acceleration; velocity; throttle position; engine speed; rotational wheel velocity; wheel slip; wheel position; clutch position; clutch pedal position; clutch pedal velocity; and clutch engagement status.

* * * * *